US009132615B2

(12) United States Patent
Karsten et al.

(10) Patent No.: US 9,132,615 B2
(45) Date of Patent: Sep. 15, 2015

(54) RETORTABLE COMPOSITION

(75) Inventors: Petrus Karsten, Grootebroen (NL); Piet De Vries, Eindhoven (NL)

(73) Assignee: SOLVAY INDUSTRIAL FOILS MANAGEMENT AND RESEARCH SA, Brussels (BE)

( * ) Notice: Subject to any disclaimer, the term of this patent is extended or adjusted under 35 U.S.C. 154(b) by 585 days.

(21) Appl. No.: 12/295,142

(22) PCT Filed: Mar. 30, 2007

(86) PCT No.: PCT/EP2007/002865
§ 371 (c)(1),
(2), (4) Date: Sep. 29, 2008

(87) PCT Pub. No.: WO2007/112969
PCT Pub. Date: Oct. 11, 2007

(65) Prior Publication Data
US 2009/0297745 A1    Dec. 3, 2009

(30) Foreign Application Priority Data

Mar. 30, 2006  (EP) .................................. 06112031

(51) Int. Cl.
*C08L 23/08* (2006.01)
*B32B 1/00* (2006.01)
*B32B 27/32* (2006.01)
*C08L 23/10* (2006.01)
*C08L 23/14* (2006.01)
*B32B 7/06* (2006.01)
*B32B 27/08* (2006.01)
*B32B 27/34* (2006.01)
*A61J 1/10* (2006.01)

(52) U.S. Cl.
CPC . *B32B 27/32* (2013.01); *B32B 7/06* (2013.01); *B32B 27/08* (2013.01); *C08L 23/10* (2013.01); *C08L 23/142* (2013.01); *A61J 1/10* (2013.01); *B32B 27/34* (2013.01); *B32B 2270/00* (2013.01); *B32B 2307/31* (2013.01); *B32B 2307/412* (2013.01); *B32B 2307/558* (2013.01); *B32B 2307/5825* (2013.01); *B32B 2439/40* (2013.01); *B32B 2439/80* (2013.01); *C08L 2205/02* (2013.01); *Y10T 428/1352* (2015.01)

(58) Field of Classification Search
CPC .......... A23L 3/02; B32B 27/30; B32B 27/32; B32B 27/34; Y10T 428/3175; Y10T 428/31928; Y10T 428/31746; Y10T 428/31757; Y10T 428/3192; Y10T 428/31743
USPC ........... 428/35.7; 206/0.5; 525/240; 604/408, 604/410, 416
See application file for complete search history.

(56) References Cited

U.S. PATENT DOCUMENTS

| | | | |
|---|---|---|---|
| 3,888,949 A * | 6/1975 | Shih | 525/240 |
| 4,461,872 A * | 7/1984 | Su | 525/240 |
| 4,608,043 A | 8/1986 | Larkin | |
| 5,176,634 A * | 1/1993 | Smith et al. | 604/87 |
| 5,209,347 A | 5/1993 | Fabisiewicz et al. | |
| 5,976,300 A * | 11/1999 | Buchanan et al. | 156/273.7 |
| 5,998,039 A | 12/1999 | Tanizaki et al. | |
| 6,077,907 A * | 6/2000 | Raetzsch et al. | 525/191 |
| 6,294,611 B1 * | 9/2001 | Takayanagi et al. | 525/191 |
| 6,391,432 B1 * | 5/2002 | Gilliard et al. | 428/220 |
| 6,500,563 B1 * | 12/2002 | Datta et al. | 428/521 |
| 6,511,755 B1 * | 1/2003 | Mochizuki et al. | 428/516 |
| 6,555,244 B1 * | 4/2003 | Yamamoto et al. | 428/500 |
| 6,682,517 B1 * | 1/2004 | Ezaki et al. | 604/410 |
| 6,713,165 B1 | 3/2004 | Karsten | |
| 6,750,284 B1 * | 6/2004 | Dharmarajan et al. | 524/515 |
| 7,026,403 B2 * | 4/2006 | Dharmarajan et al. | 525/240 |
| 7,276,558 B2 * | 10/2007 | Hori et al. | 525/191 |
| 7,476,710 B2 * | 1/2009 | Mehta et al. | 525/191 |
| 7,488,789 B2 * | 2/2009 | Ikenaga et al. | 526/348.6 |
| 7,524,910 B2 * | 4/2009 | Jiang et al. | 526/348 |
| 7,589,145 B2 * | 9/2009 | Brant et al. | 524/515 |
| 7,619,038 B2 * | 11/2009 | Mehta et al. | 525/191 |
| 7,655,317 B2 * | 2/2010 | Brant et al. | 428/515 |
| 7,655,730 B2 * | 2/2010 | Datta et al. | 525/191 |
| 7,858,701 B2 * | 12/2010 | Datta et al. | 525/191 |
| 7,871,697 B2 * | 1/2011 | Kinigakis et al. | 428/323 |
| 7,906,588 B2 * | 3/2011 | Datta et al. | 525/191 |
| 2002/0198336 A1 | 12/2002 | Resconi et al. | |
| 2004/0198912 A1 * | 10/2004 | Dharmarajan et al. | 525/240 |
| 2007/0132144 A1 * | 6/2007 | Rafailovich et al. | 264/310 |
| 2008/0176016 A1 * | 7/2008 | Tateishi et al. | 428/35.7 |
| 2010/0143627 A1 * | 6/2010 | Inoue et al. | 428/35.7 |

FOREIGN PATENT DOCUMENTS

| | | |
|---|---|---|
| EP | 1 614 699 A1 | 1/2006 |
| JP | 08-238733 A | 9/1996 |
| JP | 2001-226499 A | 8/2001 |
| JP | 2003-183462 A | 7/2003 |
| JP | 2003-528195 A | 9/2003 |
| JP | 2004-338102 A | 12/2004 |
| JP | 2005-508416 A | 3/2005 |
| JP | 2006-021504 A | 1/2006 |
| KR | 10-0190429 B1 | 6/1999 |
| WO | WO 00/61062 A1 | 10/2000 |
| WO | WO 01/70878 A1 | 9/2001 |
| WO | WO 03/040202 A2 | 5/2003 |
| WO | WO2004/087775 * | 10/2004 |

OTHER PUBLICATIONS

"Composites Using Nano-Fillers" Rothon, Roger N. (2003). Particulate-Filled Polymer Composites (2nd Edition) pp. 489-514 Smithers Rapra Technology.*
"Tie Layers" in Packham, D. E. (2005). Handbook of Adhesion (2nd Edition). John Wiley & Sons. p. 545-546 Online version available at: http://app.knovel.com/hotlink/toc/id:kpHAE00002/handbook-adhesion-2nd.*
Korean Examination Report, Appl. No. 10-2008-7026587, Jul. 22, 2013, 38 pgs.
Japanese Office Action, Application No. 2009-501963, Jul. 17, 2012, 7 pgs.

* cited by examiner

*Primary Examiner* — Ellen S Wood
(74) *Attorney, Agent, or Firm* — Paul D. Strain, Esq.; Strain & Strain PLLC

(57) ABSTRACT

Retortable, flexible essentially polyolefin composition, mono- or multi-layer structures including at least one layer comprising such a composition, containers made from such structures and specific applications thereof.

14 Claims, No Drawings

RETORTABLE COMPOSITION

The present invention relates to a retortable, flexible, essentially polyolefin composition, to mono- or multi-layer structures including at least one layer comprising such a composition, to containers made from such structures and to specific applications thereof.

Articles, such as containers, intended for medical, nutritional and pharmaceutical applications (hereinafter referred to as medical applications) must meet not only conventional requirements, such as good mechanical strength or low cost, but also requirements—extremely strict—peculiar to this specific field of application, such as, for example, requirements relating to the biocompatibility properties of the said articles, their ability to be subjected to a retort treatment, their flexibility, their transparency, their weldability or sealability, their impact strength (in particular when the containers are filled with liquids), the amount of substances which migrates from the container to the liquid or can be extracted from the container (for example, with hexane and/or purified water). In some cases, the barrier properties of the container are also critical.

Until now, commercially available articles such as containers, bags, pouches and the like (hereinafter referred to as containers) for medical use, for example infusion or pressure infusion or blood bags, and bags intended for the conservation of medical related fluids, have been based on chlorinated polymers, for example on PVC. Although having several advantages, this type of polymer, however, has certain disadvantages, such as the need to incorporate high amounts of stabilizers therein for the purpose of improving its thermal stability or to incorporate high amounts of plasticizers for the purpose of obtaining sufficient flexibility. These additives can in some circumstances be suspected to migrate and contaminate the liquid which is contained in such articles. There is therefore a market demand for articles for medical applications which are devoid of chlorinated polymers.

Due to stability, compatibility, or other concerns, some medical solutions have to be stored separately prior to administration to a patient. These solutions may be stored in separate containers, but are often stored in separate chambers of a single container. Such multi-chamber containers comprise different chambers containing different liquids which must be put into contact and mixed prior to use. To this end, the chambers and solutions are often separated by a frangible (peelable) heat seal. Examples of such containers are disclosed in U.S. Pat. Nos. 5,209,347; 5,176,634; and 4,608,043. These frangible seals can be broken by hand pressure against the sides of the bag to force the contents to break the seal and permit mixing between the components. Breaking of the seal can be obtained by pulling on opposite sides of the container, or by squeezing the container sidewalls. Such multi-chamber containers are typically made of flexible polymeric materials. Numerous polymeric films and compositions have been developed for use in such containers, which can have a mono-layer structure or a multilayer structure. The monolayer structure can be made from a single polymer, or from a polymer mixture, blend or alloy. The peelable seal must withstand sterilization or retort in the sense that after the heat treatment, substantial change of the breaking force must be avoided.

To get such containers, it is known to start from polyolefin-based structures e.g. films, tubes, injection molded articles (port members) and the like and to weld these together (or on themselves). It is more specifically known to use polypropylene (PP) based structures which include additives in order to improve some of their properties. Such additives are often elastomers used to improve the transparency, impact strength and flexibility of the PP resins. As examples of such elastomers are those including styrene and isoprene and/or butadiene and/or vinylisoprene units, hydrogenated or not (hereinafter called "SI" resins). Among those, styrene-ethylene-butadiene block copolymers (SEBS), styrene-vinylisoprene-styrene block copolymers (SVIS) and styreneisoprene-butadiene-styrene (SIBS) are preferred because they have an improved compatibility with PP resins, especially when they are at least partially hydrogenated. However, such structures have a limited sealing temperature window to make permanent seals and it is well known in the art that before using mixtures of rubber and polyolefins the mixture needs to be compounded at high shear rates making the composition vulnerable for degradation.

Patent application WO 00/61062 in the name of SOLVAY SA describes structures which may comprise a COP (cyclic olefin polymer). However, the applicant found that when a COP is used alone (i.e. as a pure constituent of a structure e.g. film or a layer there from), welding is very uneasy and the welds obtained are of poor quality, especially with the short welding times commonly used in industrial processes. Besides, after retorting like heat sterilization, transparency and flexibility are not optimal when using pure COP, even in only one layer of a multilayer structure. More particularly, multilayer structures including a pure COP layer tend to delaminate after heat sterilization.

Other structures that are known comprise often of a polyolefinic fluid contact layer and a layer having a high melting temperature, like for instance a polyester or polyamide layer, in order to make it possible to weld the circumferential seals at elevated temperatures, e.g. temperatures above the melting temperature of the polyolefinic fluid/food contact layer, in order to make such welds resistant to pressure infusion applications after retort. However such compositions are not fully recyclable due to incompatibility of the different polymers. Moreover, such structures are poor in weld strength, impact strength and tear resistance or show poor heat stability when low melting polymers are used in high amounts and show deformation at the edge of peelable seals after retort and therefore increased peel force, and/or show a small sealing window at which a peelable seal can be formed.

Fully polyolefin structures for packaging materials have also been proposed, to be used to produce medical/pharmaceutical multi-chamber containers, partitioned with frangible seals. However such structures show even poorer welding, impact strength and tear resistance properties. Their heat stability is insufficient when low melting polymers are used in high amounts to improve their welding properties.

It is an object of the invention to obtain a retortable, flexible, transparent, impact resistant, tear resistant polyolefin compositions, showing excellent controllable sealing or welding characteristics and can be sealed or welded over a broad temperature range.

It is another object of the invention to obtain monolayer or multi-layer structures such as films or tubes, of thicknesses less than 5 mm, or port members comprising such a composition, suitable for specific medical or pharmaceutical or nutritional packaging applications.

Still another object of the present invention is to provide a polyolefin composition useful as a heat sealable layer in mono- as well as in multi-ply structures, e.g. films, tubes, port members and the like, that is retortable, flexible, and transparent and further has a broad temperature range enabling both low temperature welding (at which peelable seals can be formed), and high temperature welding (at which permanent seals can be formed, enabling applications such as for example infusion, pressure infusion containers). Such permanent welds made in a structure comprising the polymer composition should have a high impact resistance, to provide a packaging container of a sufficient impact strength capable of preventing breakage caused by the drop impact even when the container is dropped from a high part.

Consequently the invention relates to a sealable and retortable composition, free from migrating substances comprising a mixture of two components, with
- the first component comprising at least one propylene/[alpha]-olefin copolymer (A),
- the second component comprising at least one propylene/[alpha]-olefin copolymer (B) and/or at least one propylene homopolymer (C), wherein
- the propylene/[alpha]-olefin copolymer (A) has at least one distinct DSC melting area between 30 and 110° C. having a heat of fusion of more than 1 J/g but of less than 65 J/g,
- the propylene/[alpha]-olefin copolymer (B) has a DSC melting point of 130-170° C.,
- the propylene homopolymer (C) has a DSC melting point of 130-170° C., and wherein
- the total amount of polymers (A), (B) and (C) is at least 80, preferably 90 percent by weight of the composition
- the amount of polymer (A) is between 15 and 85, preferably between 25 and 75, percent by weight of the total amount of polymers (A), (B) and (C).

Such composition shows outstanding sealing/welding properties when used as sealant material in various structures.

At relatively high sealing or welding temperatures, which is lower than the highest melting temperature of the highest melting polymer present in such structures, (hereinafter referred to as high temperature sealing) the composition can be used to make very strong permanent seals. At relatively low temperatures, which is higher than the lowest melting range or peak of a polymer present in the composition, the composition shows excellent peelsealability (hereinafter referred to as low temperature sealing) to make peelable seals over a broad temperature range. The composition can as well be used in a monolayer structure (constituted preferably essentially of the composition according to the invention) as well as a sealing layer in a multilayer structure.

Such composition is thus intended for making for example films and/or tubes and/or port members, for flexible, transparent, retortable mono-compartment containers as well as for easy peelable multi-chamber containers for storing, packaging, administrating and transporting pharmaceutical, nutritional and medical liquids/fluids. The composition comprises of a mixture or blend or alloy of polyolefins with unique sealing characteristics, which can be retorted at elevated temperatures without deformation, which is transparent when formed into sheets or films, which shows an excellent impact strength and which is flexible e.g. having an elastomeric, soft touch at ambient temperatures.

Consequently, the invention relates also to the use of a composition according to the invention as sealant material.

The invention relates also to flexible, transparent, sealable and retortable structures having at least one weldable surface layer comprising the polymer composition according to the invention.

The invention relates finally also to containers comprising such structures and their medical, pharmaceutical and nutritional applications.

The compositions, system and containers according to the invention are preferably essentially polyolefinic, in the sense that they are fully made out of polyolefin polymers, to the exception of additives such as nanocomposites, stabilizers, processing aids. They comprise advantageously at least 80%, preferably 90%, more preferably 95%, most preferably 98 wt % of polyolefins. In some situations they comprise advantageously 100 wt % polyolefins.

Herein the term container refers to bags or pouches optionally containing one or more port members, for example medical and pharmaceutical devices, medical/pharmaceutical disposables and the like.

Herein the term pressure infusion test refers to a creep treatment in a pressure cuff at 400 mm Hg for 72 hours or more during and after which no opening of the weld or seal is allowed to occur. The containers are placed in a cuff in such a way that at least 2 cm on each side is sticking out, therefore a pressure from within is applied on the part sticking out where there is no counter pressure (e.g. where the container can freely inflate, but has to resist this pressure).

Herein, the term peelable means that when heat sealing or welding a structure, comprising the composition as a sealing layer, to another structure, optionally also comprising the composition as a sealing layer, or sealing or welding a folded structure, comprising the polymer composition, on itself (composition face to face), a weak or frangible seal can be formed resulting in a packaging concept that can be easily opened before or after a retort treatment when force is applied on the seal, without the formation of particles or fibers or other disruption of the packaging or the welds.

The term peelable seal also refers to a weld or seal with a maximum peal strength above 2 N/15 mm and below 15 N/15 mm before and after retort (according to ASTM F88).

Herein the term permanent seal refers to a weld or seal with a minimum strength of at least 15 N/15 mm (according to ASTM F88) after retort and therefore can not be easily peeled or broken.

Herein the term flexible implies that when a welded container, made of the welded or sealed structure including the composition, is filled with a liquid, it can be emptied purely due to gravity e.g. it is collapsible (e.g. the container is self emptying without venting).

Herein the term transparent means that the structure including the composition has a haze value less than 25% (according to ASTM D1003 (A) when the composition is made (by heating and pressing) into a film, sheet of approximately 200 microns).

Herein the term pressure infusion refers to a fast administrating treatment under pressure, using a cuff in which the container is placed under pressures up to 400 mm Hg.

Herein the terms retortable and/or retort treatment refers to a heat treatment at elevated temperatures up to 135° C., preferably at 121° C., for a limited time of less than a few hours, of a structure comprising the composition without significantly changing the original shape of the structure, for example in an autoclave with pressurized water or steam or in a magnetron or in a hot air oven.

Herein the term free from migrating substances means that there are either no migrating substances at all or the amont is so low as to not adversely affect the medical products stored within e.g. a container made from the composition. No leachable materials, such as plasticizers, are added to the composition. The composition and containers therefrom meet the European Pharmacopoeia $3^{rd}$ edition 3.1.6. and USP Class VI test protocols.

Herein the term polyolefin and/or polyolefinic refers to thermoplastic polymers/resins consisting primarily of monomeric units derived from ethylene, propylene, 1-butene, 2-methyl-1-propene, 1-pentene, 2-methyl-1-butene, 3-methyl-1-butene, 1-hexene, 2-ethyle-1-butene, 2,3-dimethyl-1-butene, 2-methyl-1-pentene, 3-methyl-1-pentene, 4-methyl-1-pentene, 3,3-dimethyl-1-butene, 1-heptene, methyl-1- hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene, and the like.

The composition according to the invention comprises a mixture or blend of a propylene/[alpha]-olefin copolymer (A) and of a propylene/[alpha]-olefin copolymer (B) having an [alpha]-olefin content different from that of the copolymer (A), and/or a propylene homopolymer (C) herein after specified.

Also, the present invention relates to a sealing layer using the mentioned composition in a retortable mono- or multilayer structure.

The propylene/[alpha]-olefin copolymer (PP-A or A) according to the present invention has at least one distinct endothermic (melting) area or peak as can be determined by DSC (ISO 3146, 10° C./min) when measured several days after the last heat treatment, e.g. extrusion or retorting, which is situated below 110° C. and above 30° C. and has a heat of fusion of more than 1 J/g and of less than 65 J/g. It is recommended that the total heat of melting of the polymer between 30 and 110° C. represents at least 10% of its total heat of melting, when measured by DSC several days after its last heat treatment. Furthermore the polymer shows optionally other endothermic area's or peaks due to crystallinity. The propylene/[alpha]-olefin copolymer has advantageously 60 wt %, preferably 70 wt % and most preferably 80 wt % or more and less than 96 wt %, preferably less than 94 wt % units derived from propylene, including isotactically and/or syndiotactically arranged propylene derived sequences.

The polypropylene/[alpha] olefin copolymer (A) is preferably made by metallocene catalyst technology to enable a moderate level of crystallinity and elastomeric properties. Such moderate level of crystallinity and such elastomeric properties can be achieved by specific incorporation of [alpha]-olefinic monomers in combination with inverted propylene sequences in the polymer chain as can be determined with NMR (Nuclear Magnetic Resonance). Furthermore the propylene/[alpha]-olefin copolymer (A) has a recommended density (ASTM D972) lower than 0.90 g/cc, preferably lower than 0.88 g/cc and an elongation at break of at least 600%, preferably 800% (ASTM D639, ASTM D882, 20 inch/minute, measured on compression molded specimens). A 200µ thick film formed of propylene/[alpha]-olefin copolymer (A) preferably has a tensile modulus comprised between 50 and 500 MPa. (ASTM D882, compression molded specimens 23° C., 50% RH). The [alpha]-olefin content of the propylene/[alpha]-olefin copolymer (A) is preferably between 2 and 20 percent by weight, more preferably between 4 and 17 percent by weight and most preferably between 5 and 17 percent by weight. The [alpha]-olefin of the propylene/[alpha]-olefin copolymer (A) has advantageously 2 or 4-12 carbon atoms. It is advantageously selected from: ethylene, 1-butene, 2-methyl-1-propene, 1-pentene, 2-methyl-1-butene, 3-methyl-1-butene, 1-hexene, 2-ethyle-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene, two or more of these can be used. That is, specific examples of the propylene/[alpha]-olefin copolymer (A) according to the present invention, in addition to copolymers such as propylene/ethylene copolymers, propylene/butene copolymers, can also be terpolymers such as propylene/ethylene/butene or hexene or octene co-ter- or even quarter polymers.

The propylene/[alpha]-olefin copolymer (PP-B or B) according to the present invention has a melting point of 130-170° C. as can be determined by DSC (ISO 3146), preferably 135-155° C. Furthermore the propylene/[alpha]-olefin copolymer (B) has preferably 92 wt % or more units derived from propylene, including isotactically or syndiotactically arranged propylene derived sequences and further has advantageously a heat of fusion of more than 30 J/g. Furthermore, the polypropylene/[alpha]-olefin copolymer (B) has preferably a density (ASTM D972) above 0.88 g/cc and an elongation at break lower than 800% (ASTM D639, ASTM D882, 20 inch/minute, measured on compression molded specimens). A film formed of propylene/[alpha]-olefin copolymer (B) preferably has a tensile modulus of 300-1700 MPa (ASTM D882, compression molded specimens 23° C., 50% RH). As the [alpha]-olefin of the propylene/[alpha]-olefin copolymer (B), [alpha]-olefins having 2 or 4-12 carbon atoms as mentioned here before can be used.

The propylene homopolymer (PP-C or C) according to the present invention has a melting point of 130-170° C. as can be determined by DSC (ISO 3146), preferably 158-170° C. in case of an isotactic homopolymer or around 135° C. in case of a syndiotactic homopolymer. A film formed of propylene homopolymer (C) preferably has a tensile modulus of 300-2200 MPa (ASTM D882, compression molded specimens 23° C., 50% RH).

The sealable or weldable and retortable composition according to the present invention may be a mixture of one or more propylene/[alpha]-olefin copolymers (A), and one or more propylene/[alpha]-olefin copolymers (B), and/or one or more propylene homopolymers (C), i.e. from the type (A) and (B) or (A) and (C) or (A) and (B) and (C).

In a preferred embodiment of the invention, the mixture of (A) and (B) and or (C) as a whole has a MFR (ASTM D 1238 230° C., 2.16 kg) of less than 10 g/10 min. Higher values of MFI may indeed result in deformation during a retort treatment. The total amount of polymers (A), (B) and (C) is at least 80 wt % or more, preferably 90 wt % or more, more preferably 95 wt % or more in the composition.

In the present invention, it is preferred that the [alpha]-olefin in the polymers (A) or (B) is ethylene and, more preferably, the [alpha]-olefin in both polymers (A) and (B) is ethylene.

It is preferred that the mixing ratio of the propylene/[alpha]-olefin copolymer (A) to the propylene/[alpha]-olefin copolymer (B) and/or the propylene homopolymer (C) is comprised between 15-85:85-15 by weight, more preferably between 20-80:80-20, particularly preferably between 25-75: 75-25.

If the amount of propylene/[alpha]-olefin copolymer (A) is between 15 and 85 by weight and the amount of propylene/[alpha]-olefin copolymer (B) and/or the propylene homopolymer (C) is between 85 and 15% by weight (limit values excluded) the composition shows no significant deformation during a retort treatment, has sufficient flexibility, has sufficient impact and tear resistance and shows excellent sealing behavior to form either peelable seals over a broad temperature range and/or pressure infusion resistant permanent seals.

If the amount of propylene/[alpha]-olefin copolymer (A) is less than or equal to 15% by weight and the amount of propylene/[alpha]-olefin copolymer (B) and/or the propylene homopolymer (C) are/is more than or equal to 85% by weight the sealability of the composition becomes too low to make peelable seals with a maximum peel strength above 2 N/15 mm over a broad temperature range. Also other relevant properties, such as impact and tear resistance and resistance to withstand a pressure infusion treatment after retort are deteriorated.

If the amount of propylene/[alpha]-olefin copolymer (A) is more than or equal to 85% by weight and the amount of propylene/[alpha]-olefin copolymer (B) and/or the propylene homopolymer (C) are/is less than or equal to 15% by weight, the composition starts to deform during retorting and the peak peel strength of peelable seals made with the composition becomes too high after retort treatment and the composition becomes too sticky.

The composition according to the present invention can be prepared by a conventional method from a mixture of the propylene/[alpha]-olefin copolymer (A) and the propylene/[alpha]-olefin copolymer (B) and/or the propylene homopolymer (C). The method of mixing the polymers is not particularly limited but it is preferable that the resin pellets are preliminarily tumbled or that they are melt blended using a single or double-screw extruder.

At the time of fabrication of the composition or when the composition according to the present invention is processed into pressure infusion resistant or easily peelable welded or sealed structures, conventionally known ingredients such as heat stabilizers, nanoclays, antioxidants, ultraviolet absorbents, lubricants anti-blocking agents, antistatic agents, pigments, anti-microbial agents may be added to it. A preferred amount of the ingredients added is 0.0-5.0 wt % based on the composition. Preferably the amount of antioxidants is less than 3000 ppm. Insofar as the properties of the easily peelable or pressure infusion resistant structures according to the present invention are not adversely affected, thermoplastic resins such as compatibilizers, elastomers, etc. may be added in an amount up to 20 wt % of the composition and preferably up to 10 wt % of the composition. Known surface treatments such as ozone treatment, corona treatment, nanocoating treatment, vapor deposition treatment, etc. may also be carried out.

The easily peelable and/or pressure infusion resistant composition according to the present invention may be used for the manufacture of a multilayer structure, comprising the easily peelable and/or pressure infusion resistant composition in at least one sealing layer thereof and/or one or more other layers and/or comprising one or more layer(s) of another resin or composition laminated thereon or coextruded with the surface layer in order to improve the gas and/or water barrier properties, mechanical properties and the like. Such other layers as used herein may include polymers or blends of polymers selected from the group consisting of: [alpha]-olefin type resins such as polypropylene type resins, propylene/[alpha]-olefin copolymers, polyethylene type resins, ethylene/[alpha]-olefin copolymers, polybutene containing co- and/or terpolymers and the like, cyclic polyolefin (COP) type resins and/or its copolymers, ethylene/vinyl alcohol copolymers (EVOH), ethylene/vinyl alcohol copolymer blends with polyamide type resins, ethylene/vinyl acetate copolymers (EVA) and ethylene alkyl acrylate copolymers, e.g. EMA, EEA, polyvinylidene dichloride (PVDC) and the like, as well as thermoplastic resins such as polyamide (PA) type resins, polyester and/or polyamide elastomers (like PCCE or PEBA), fluorine type resins (ECTFE, FEP, MFA, PFA, PVDF and the like) and polyester type resins, tie-resins, e.g. maleinic anhydride graft polymers and/or copolymers, grafted versions of component (A) or (B) or (C) and/or mixtures thereof and/or grafted versions of its mixtures, styrenic block copolymers, e.g. SEBS, SIVHS, grafted with maleinic anhydride or not, and the like.

The structures comprising the easily peelable and/or pressure infusion resistant composition according to the present invention can be produced by methods similar to the processing methods used for general thermoplastic resins, such as T-die or Flat-die molding, e.g. cast film, inflation molding, e.g. blown film, and the like. The composition can also be used to produce easy weldable injection molded components to be used in combination with the structures e.g. films and tubes. The easily peelable and/or pressure infusion resistant multilayer structure can be produced by methods such as co-extrusion, laminating and extrusion coating.

Multilayer structures can be formed by co-extrusion, extrusion lamination, lamination, or any suitable means. The multilayer structures can include layers such as a solution contact layer, a scratch resistant layer, a barrier layer for preventing permeation of oxygen, carbon dioxide or water vapor, tie layers, nanocoatings (e.g. a polymeric coating including clay particles like montmorrilonite, vermiculite and the like) or other layers. One or more layers can advantageously comprise nanocomposites in the bulk of the layer. Such nano composites or nanocoatings can improve several properties of the structure, as the barrier properties. Selection of the appropriate structure depends on the solution to be contained within the container.

Containers are typically formed by placing one or more polymeric structures e.g. films or sheets in registration by their peripheral portions and sealing the outer periphery to form a fluid tight container. The peripheral seals are permanent, and therefore, do not peel. The sheets are sealed by heat sealing, radio frequency sealing, thermal transfer welding, adhesive sealing, solvent bonding, and ultrasonic or laser welding. Blown extrusion is another method used to make the container. Blown extrusion is a process that provides a moving tube of extrudate exiting an extrusion die. Air under pressure inflates the tube. Longitudinal ends of the tube are sealed to form the container. A blown extrusion process only requires forming seals along two peripheral surfaces. A peelable seal having a peel strength lower than the peripheral or circumferential seal can be formed in the container by various methods such as using a lower heat sealing temperature than used to form the peripheral seal.

The structures containing the composition according to the present invention have a thickness of about 5-5000 μm and, more preferably, 10-2000 μm. If the composition is thinner than 5 μm, the strength of the composition is insufficient as a layer or it is difficult to form partition walls having excellent peelability or it is difficult to form a pressure infusion resistant high temperature seal or weld. If the composition is thicker than 5000 μm, the flexibility of the composition as a structure is decreased and welding of the structure becomes difficult.

Furthermore, if the easily peelable or pressure infusion resistant composition according to the present invention is used as a layer in a multilayer film or sheet, this film or sheet has a thickness of about 10-500 μm and, preferably 50-400 μm.

The easily peelable or pressure infusion resistant composition or the easily peelable pressure infusion resistant composition in a multilayer structure according to the present invention may be used as it is as a retortable packaging for liquids, as an infusion bag, a lid material for an easily peelable container, a sealing film structure for rubber stopper caps of an infusion bag or may be molded into medical packaging containers having easily peelable partition walls. Although the packaging containers can be molded by heat welding the structure, they can also be produced directly from the above mixtures by blow molding, vacuum forming or similar methods. The packaging containers include infusion containers, pressure infusion containers, multi-chamber containers, blister packs, and other medical devices and disposables, etc.

In another embodiment the composition is used as at least one layer in a tube. This tube has a thickness between 5-5000 µm, and preferably 50-3000 µm. The tube shows excellent retortability, weldability or sealability and/or heat bonding.

In another embodiment the composition can be used as a port member or an injection molded part, such as a connector, stopper, a break port, a luer lock, boat port and the like, where the port member shows excellent retortability, weldability or sealability and/or heat bonding.

Among the medical packaging containers comprising the structure according to the present invention, for example, multi-chamber containers can be obtained by welding the central portion of a tubular film obtained by inflation molding at a low temperature to form two chambers partitioned by the easily peelable partition wall, filling the chambers with desired contents, and strongly heat welding the peripheral portion of the tubular film. Also, the above container can be obtained by forming the chambers partitioned by the easily peelable partition walls mentioned above, then strongly heat welding the peripheral portion of the film such that a port member for filling the contents is inserted in the peripheral portion of the film. Furthermore, the partition wall of the container can also be formed by inserting pieces of a film containing (or preferably constituted from) the composition according to the present invention at relevant places between portions of a film not having easy peelability, and heat welding the inserted portions from outside the container.

In order to form easily peelable partition walls using the easily peelable and/or pressure infusion resistant composition according to the present invention, heat welding is performed at least above the low temperature endothermic area of component (A). As compared with the conventional low temperature welding that has to be performed in a narrow temperature range of a few ° C., when easily peelable partition walls are formed using the composition for film according to the present invention, the temperature range is sufficiently broad that molding failure of the easily peelable partition walls will hardly occur. Low temperature welding under the above conditions can produce easily peelable partition walls having a maximum peel strength (ASTM F88) of 2-15 N/15 mm (tension speed: 500 mm/minute). The multi-chamber container having the partition walls can be compressed by hand to release, or break the partition walls and allow the plurality of chambers to easily communicate with each other.

On the other hand, to form a strong circumferential high temperature weld of a pressure infusion container or of a multi-chamber container, heat welding is performed below the temperature where the composition becomes too viscous or below the melting point of component (B) or (C) in case of a monolayer structure. In case of a multilayer structure the welding temperature in general is limited to the highest temperature at which no sticking to the electrode takes place or to the temperature at which the sealing or welding layer becomes to viscous to resist the welding or sealing pressure.

As the method for heat welding, the same methods as those methods used for welding ordinary olefin type thermoplastic resins such as welding using a hot mold, supersonic welding and high frequency welding, can be used as described before.

The single-chamber or multi-chamber container produced, may include, after filling the contents in the chambers and sealing, not only fluids such as infusion preparations, dialysis solutions, nutrition solutions and exchange solutions for filtration, but also powders, solids, etc. The above-described containers undergo no severe deformation during retort at employed temperatures and the circumferential weld is resistant to a pressure infusion test at 400 mm Hg for 72 hr.

EXAMPLES

The present invention will now be described in more details in the following examples.

The resins used in the examples are specified below. The resins have been molded into pellets before they were used.

PP-A1: A Propylene/[alpha]-olefin, [alpha]-olefin being ethylene, copolymer manufactured by Exxonmobil under the trade name Vistamaxx™. Having a first endothermic peak as determined by primary heating DSC (ISO 3146, 10° C./min): 53.4° C., Hfl 6.5 J/g. A second endothermic peak as determined by primary heating DSC: 162° C., Hfl 5.6 J/g. A melt flow rate (MFR) (ASTM D 1238, 230° C., 2.16 kg): 4.5 g/10 minutes. Shore A hardness (ASTM D 2240, on compressed molded specimens) of 57. A density (compression molded samples, ASTM D792 23° C.): 0.86 g/cc.

PP-A2: A Propylene/[alpha]-olefin copolymer manufactured by Exxonmobil under the tradename Vistamaxx™. Having a different melt flow rate compared to PP-A1 being 2.6 g/10 minutes (ASTM D 1238, 230° C., 2.16 kg). Having an endothermic peak as determined by primary heating DSC: 51° C. Hfl 3.6 J/g (ISO 3146, 10° C./min).

PP-A3: A Propylene/[alpha]-olefin copolymer, commercially available. Having a density of 0,868 (ASTM D792), MFR of 2.0 (ASTM D1238), durometer hardness (A scale, ASTM D 2240) of 88. A glass transition temperature (DSC method) of −18.4° F. (−28° C.) and a vicat softening point (ASTM D1525) of 86° F. (30° C.) and an [alpha]-olefin content around 12 wt %.

PP-B: A polypropylene ethylene copolymer with a tensile modulus (ASTM D882): 950 MPa. Melting point: (DSC, ISO 3146): 150° C. MFR (ISO 1133, 230° C., 2.16 kg): 1.8 g/10 minutes. Tensile elongation at break (ISO 527-2): >50% and <600%, an [alpha]-olefin content around 2 wt %. Manufactured by Basell under the tradename Purell™.

PP-C1: A polypropylene isotactic homopolymer with a MFR 3,2 g/10 min (ISO 1133, 230° C., 2.16 kg). Melting point: (DSC, ISO 3146): 161-165° C., manufactured by Borealis.

PP-C2: An Isotactic homopolymer PP with a flexural modulus (ISO 178, compression moulded specimens 23° C., 50% RH): 1450 MPa. Melting point (DSC, ISO 3146): 162-166° C. MFR (ISO 1133, 230° C., 2.16 kg): 8.0 g/10 min. Density (ISO 1183): 0,905 kg/m3. Manufactured by Borealis.

D: VLDPE: DEX PLASTOMERS 8201. A copolymer of ethylene and octene and a DSC melting point (ASTM D3418) of 70° C. MFR (ISO 1133, 190° C., 2.16 kg) of 1.1 g/10 minutes. A density of 882 kg/m3 (ISO 1183, 23° C.). A shore A hardness of 85 (ISO 868).

E: SEBS: Kraton polymers Kraton G1657M, a styrenic containing block elastomeric polymer. With a polystyrene content between 12.3 and 14.3 wt % and a shore A hardness (measured on compression molded samples at 300° F.) of 47.

Examples 3 to 9 According to the Present Invention and Comparative Examples 1, 20 2, 10 and 11

Mixtures were prepared by tumbling PP-A1 and PP-B pellets in a weight mixing ratio as described in table 1. The mixed pellets were then extruded in a 45 mm single screw extruder at temperatures ranging from 135° C. on the first zone to about 185° C. on the die, into tubular films of 200 μm in wall thickness and of 60 mm in lay flat width. After approximately 72 hours or more, kept under ambient conditions, the tubular films were cut into portions having a length of 220 mm. Then the cut films were welded at one end at 148° C. for 2 seconds and 6 bars using a brass heat seal electrode in order to form containers. Thereupon the containers have been filled with 125 ml of water and after this the top end of the container was also sealed under the same welding conditions.

In a next step, after keeping the containers (hereinafter referred to as samples, each condition prepared in triplicate) for at least 72 hours in a conditioned environment at room temperature the samples were retorted as follows: In a first step the filled samples were heated in a pressurized steam autoclave with approximately 3° C./min till 125° C., in a second step the samples were kept steady in the autoclave for 30 minutes, in a third step the samples were cooled in the autoclave with approximately 2° C./min till about 60° C. After that the autoclave was opened to allow the samples to cool down to room temperature overnight. After this retort treatment the samples were conditioned for at least 72 hours in a controlled environment.

The samples were then judged for shape stability. The result Fail (F) was given to deformed samples having an increase in width of the lay flat of more than 10% at any point or for samples that were fully melted. For samples deformed less than 10% the result Pass (P) was given. The results are given in table 1.

The samples were then tested (so after retort treatment) in a pressure cuff for 72 hours under a constant load of 400 mm Hg at constant ambient temperatures. The result Fail (F) was given to samples not surviving 72 hours and the result Pass (P) was given for samples surviving the pressure infusion test. The results are given in table 1.

TABLE 1

Compositions, shape stability results and pressure infusion test results.

| Example # | Wt % PP-A1 | Wt % PP-B | Shape stability results | Pressure Infusion test results |
|---|---|---|---|---|
| 1 | 100 | 0 | F | n.a.* |
| 2 | 90 | 10 | F | P |
| 3 | 80 | 20 | P | P |
| 4 | 70 | 30 | P | P |
| 5 | 60 | 40 | P | P |
| 6 | 50 | 50 | P | P |
| 7 | 40 | 60 | P | P |
| 8 | 30 | 70 | P | F |
| 9 | 20 | 80 | P | F |
| 10 | 10 | 90 | P | F |
| 11 | 0 | 100 | P | F | n.a.*: Not applicable, this sample was melted during the retort treatment.

Another set of samples, extruded as described above, were cut into more portions of a length of 220 mm. Then a peel seal over the width of the extruded film was made in the middle of the sample, in order to make containers with two chambers, separated by the seal. The following sealing conditions were used: sealing time of 0,5 s, sealing pressure of 6 bar and sealing temperatures of 120° C., 125° C. and 130° C. respectively. Then both chambers were filled with 40 ml of water and separately sealed at 148° C. for 2 seconds and 6 bars using a brass heat seal electrode. After having applied the same retort treatment and conditioning as described above, the samples were peeled according to ASTM F88 on a tensile tester. For samples having a maximum seal force lower than 2 N/15 mm or higher than 15 N/15 mm or for samples that did not show peeling behavior the result Fail (F) was given for peel sealability. For samples having a maximum seal force higher than 2 N/15 mm and lower than 15 N/15 mm the result Pass (P) was given. The results are given in table 2.

TABLE 2 results regarding peel sealability after retort treatment for different welding temperatures.

| Example # | Sealed at 120° C. [N/15 mm] | Sealed at 125° C. [N/15 mm] | Sealed at 130° C. [N/15 mm] | Peel sealability |
|---|---|---|---|---|
| 1 | n.a.* | n.a.* | n.a.* | F |
| 2 | 20.4 | 19.6 | 21.9 | F |
| 3 | 22.1 | 29.8 | 30.9 | F |
| 4 | 21.5 | 21.8 | 24.0 | F |
| 5 | 6.5 | 8.2 | 4.8 | P |
| 6 | 3.8 | 2.1 | 3.2 | P |
| 7 | 2.7 | 2.1 | 3.0 | P |
| 8 | 2.3 | 2.0 | 2.0 | P |
| 9 | 2.0 | 2.1 | 2.2 | P |
| 10 | 0 | 1.5 | 2.1 | F |
| 11 | 0 | 0.6 | 1.0 | F | n.a.*: Not applicable, this sample was melted during the retort treatment.

From tables 1 and 2 it can be seen that the samples 3 up to 11 show sufficient shape stability during retort treatment and excellent peelsealability over a broad temperature range and/or excellent pressure infusion resistance. Samples 1 and 2 however do not show acceptable shape stability and samples 10 and 11 do not show sufficient peelsealability nor sufficient pressure infusion resistance. These samples therefore are not in the scope of this invention.

Examples 12 to 23 According to the Present Invention

In examples 12 to 23 according to the present invention several other compositions were made following the same procedures and test methods as described under examples 1 to 11. Compositions and results are given in table 3 and 4.

TABLE 3

Compositions, shape stability results and results regarding pressure infusion test.

| Example # | Wt % PP-A1 | Wt % PP-A2 | WT % PP-A3 | Wt % PP-B | WT % PP-C1 | WT % PP-C2 | WT % D | Shape Stability | Pressure Infusion test |
|---|---|---|---|---|---|---|---|---|---|
| 12 | 70 | | | 30 | | | | P | P |
| 13 | 60 | | | 40 | | | | P | F |
| 14 | 50 | | | 50 | | | | P | F |
| 15 | 45 | | | 25 | 25 | | 5 | P | P |
| 16 | | 50 | | 50 | | | | P | P |

TABLE 3-continued

Compositions, shape stability results and results regarding pressure infusion test.

| Example # | Wt % PP-A1 | Wt % PP-A2 | WT % PP-A3 | Wt % PP-B | WT % PP-C1 | WT % PP-C2 | WT % D | Shape Stability | Pressure Infusion test |
|---|---|---|---|---|---|---|---|---|---|
| 17 | 45 | | | | | 45 | 10 | P | P |
| 18 | 50 | | | | | 50 | | P | F |
| 19 | 45 | | | | | 50 | 5 | P | F |
| 20 | 45 | | | | 50 | | 5 | P | F |
| 21 | | | 50 | 50 | | | | P | P |
| 22 | | | 40 | 60 | | | | P | F |
| 23 | | | 30 | 70 | | | | P | F |

P = Pass and F = Fail.

TABLE 4 results regarding peel sealability after retort treatment for different welding temperatures.

| Example # | Sealed at 120° C. [N/15 mm] | Sealed at 125° C. [N/15 mm] | Sealed at 130° C. [N/15 mm] | Peel sealability |
|---|---|---|---|---|
| 12 | 6.7 | 8.3 | 9.7 | P |
| 13 | 2.8 | 3.1 | 2.1 | P |
| 14 | 2.0 | 2.3 | 2.1 | P |
| 15 | 2.4 | 1.5 | 1.7 | F |
| 16 | 2.3 | 4.1 | 4.3 | P |
| 17 | 2.6 | 2.2 | 3.7 | P |
| 18 | 3.1 | 3.3 | 3.2 | P |
| 19 | 2.1 | 3.0 | 2.4 | P |
| 20 | 2.6 | 2.1 | 3.0 | P |
| 21 | 4.2 | 5.2 | 4.4 | P |
| 22 | 3.6 | 2.4 | 3.0 | P |
| 23 | 2.3 | 2.1 | 2.1 | P |

P = Pass and F = Fail.

From tables 3 and 4 it can be seen that all the samples prepared and measured show good shape stability and are either showing resistance to a pressure infusion test or significant good peel sealability or both.

Comparative Examples 24 to 36

Comparative examples 24 to 36 were made following the same procedures and test methods as described under examples 1 to 11. Compositions and results are given in table 5 and 6.

TABLE 5

Compositions, shape stability results and results regarding pressure infusion test.

| Example # | Wt % PP-A1 | WT % PP-A3 | Wt % PP-B | WT % PP-C1 | WT % D | Wt % E | Shape Stability | Pressure Infusion test |
|---|---|---|---|---|---|---|---|---|
| 24 | | 10 | 90 | | | | P | F |
| 25 | 90 | | | 10 | | | F | P |
| 26 | | | 30 | | | 70 | F | F |
| 27 | | | 50 | | | 50 | F | P |
| 28 | | | 60 | | | 40 | P | P |
| 29 | | | 70 | | | 30 | P | F |
| 30 | | | 80 | | | 20 | P | F |
| 31 | | | 90 | | | 10 | P | F |
| 32 | | | 20 | | 80 | | F | n.a.* |
| 33 | | | 50 | | 50 | | F | P |
| 34 | | | 60 | | 40 | | F | P |
| 35 | | | 70 | | 30 | | P | F |
| 36 | | | 80 | | 20 | | P | F | n.a.* Not applicable, this sample was melted during the retort treatment.

TABLE 6 results regarding peel sealability after retort treatment for different welding temperatures.

| Example #: | Sealed at 120° C. [N/15 mm] | Sealed at 125° C. [N/15 mm] | Sealed at 130° C. [N/15 mm] | Peel sealability |
|---|---|---|---|---|
| 24 | 0.8 | 1.1 | 1.4 | F |
| 25 | 22 | 25 | 23 | F |
| 26 | 16.6 | 18.4 | 15.2 | F |
| 27 | 4.2 | 2.5 | 4.1 | P |
| 28 | 2.3 | 1.7 | 2.1 | P |
| 29 | 1.9 | 1.5 | 1.5 | F |
| 30 | 1.8 | 1.9 | 2.6 | F |
| 31 | 1.5 | 1.8 | 2 | F |
| 32 | n.a.* | n.a.* | n.a.* | n.a.* |
| 33 | 11.1 | 10.3 | 10.8 | P |
| 34 | 3.4 | 3.5 | 4.3 | P |
| 35 | 1.9 | 2.2 | 2.8 | P |
| 36 | 1.0 | 1.7 | 2.1 | F | n.a.*: Not applicable, this sample was melted during the retort treatment.

As can be seen from the tables 5 and 6, when polypropylene homo and copolymers are mixed and/or melt blended with elastomers like Styrene block copolymers (SEBS), the window for getting the required properties is very small, limited to the composition as mentioned in example 28, moreover significant amounts of such elastomers are needed to impart the required properties.

Examples 37 to 41 According to the Present Invention

In these examples, various films, tubes, stoppers and port members were processed for assembling them into 6 series of containers. The containers were submitted to different tests. 15.

In examples 37 and 38, mixtures for the processing of two-layer films were prepared by tumbling and melt blending pellets in weight mixing ratios as described in table 7. Then the mixed pellets were extruded, using two 45 mm single screw extruders at temperatures ranging from 135° C. on the first zone to about 185° C. on the multi-layer die, into tubular two layer films (examples 37 and 38) of 200 µm in total wall thickness of which 50 µm outer layer and 150 µm inner layer, i.e. sealing layer or fluid contact layer, and of 120 mm in lay flat width.

After approximately 72 hours or more, kept under ambient conditions, the tubular films were cut into portions of a length of 370 mm.

In example 39, a mixture was prepared for the processing of tubes by tumbling and melt blending pellets in a weight mixing ratio as described in table 7. The mixed pellets were then extruded, using a 45 mm single screw extruder, into a tube with dimensions 6.0×8.0 mm (ID/OD). After approximately 72 hours or more, kept under ambient conditions, the tubes were cut in pieces of 60 mm in length.

In example 40, a mixture was prepared in the same way in a mixing ratio as described in table 7. From this mixture stoppers were injection molded in a size to enable a fit with the tube.

Similarly, in example 41, boat port members were injection molded. From those components, six series (I to VI) of containers were prepared as described in table 8.

The containers of series I to IV were all welded at the bottom part with a straight seal at 148° C. for 2 seconds using a brass heat seal electrode. For series I and III two tubes were welded in the top part at 148° C. for 2 seconds and 6 bars. For series II and IV one portmember was welded in the top part at 148° C. for 2 seconds. Both Tubes and portmembers were preheated before welding. Thereupon the containers have been filled with 1250 ml of water. The containers of series I and III (with tubes) were then closed with the stoppers of example 40. The series II and IV of containers (with the boat ports) were closed by closing the top end of the boat port.

The containers of series V and VI were sealed over the width of the film in the middle of the samples in order to make containers with two chambers, separated by the seal. The sealing conditions were: sealing time of 0.5 seconds, sealing pressure of 6 bar and sealing temperatures 120° C., 125° C. and 130° C. respectively. Then both the bottom as well as the top side were filled with 400 ml of water and separately sealed at 148° C. for 2 seconds and 6 bars using a brass heat seal electrode in order to form containers with 2 chambers separated via the peel seal.

In a next step, all containers (series I to VI) were retorted and conditioned following the same procedure as described before. All subsequent tests were made on retorted containers.

The containers, including tubes, stoppers, and boat ports, were then judged for shape stability. For visually deformed samples the result Fail (F) was given. For samples not visually deformed the result Pass (P) was given.

For the container series I and III an evaluation of the connection between the stoppers and the tubes was done. When it proved impossible to further move the stopper into the tubes by applying force with a thumb the result Pass (P) was given.

The containers of series I to IV were tested in a pressure cuff for 72 hours under a constant load of 400 mm Hg at constant ambient temperatures. The result Fail (F) was given to samples not surviving 72 hours and the result Pass (P) was given for samples surviving the pressure infusion test.

A drop test was performed on containers from series I to IV, in such a way that the filled containers were dropped horizontally on a flat floor from a height of two meters. The result Pass (P) was given for samples surviving the drop test without leakage, the result Fail (F) was given for those samples not surviving the drop test.

The containers from series I to IV were also submitted to seal strength test on the bottom weld according to ASTM F88 in a tensile tester. The result Pass (P) was given for samples having a maximum seal strength above 15 N/15mm. The result Fail was given to samples with lower seal strength.

The peelable seals in the middle of the containers of series V and VI were subjected to a peelseal test according to ASTM F88 on a tensile tester. For samples having a maximum seal force lower than 2 N/15mm or higher than 15 N/15mm or for samples that did not show peeling behavior the result Fail (F) was given for peel sealability. For samples having a maximum seal force higher than 2 N/15mm and lower than 15 N/15mm the result Pass (P) was given. The results are given in table 9.

TABLE 7 compositions examples 37-41.

| Example # | Wt % PP-A1 | Wt % PP-A2 | Wt % PP-B | Wt % PP-C2 | Wt % E |
|---|---|---|---|---|---|
| 37 & 38 Outside Layer film | | | 20 | 70 | 10 |
| 37 Inside Layer film | 50 | | 50 | | |
| 38 Inside Layer film | | 50 | 50 | | |
| 39 Tube | 75 | | 25 | | |
| 40 Stopper IM | 40 | | | 60 | |
| 41 Boat port IM | 40 | | | 60 | |

TABLE 8 test series I to VI.

| Container # | Film | Tubing | stopper | Boat port |
|---|---|---|---|---|
| Series I | 37 | 39 | 40 | |
| Series II | 37 | | | 41 |
| Series III | 38 | 39 | 40 | |
| Series IV | 38 | | | 41 |
| Series V | 37 | | | |
| Series VI | 38 | | | |

TABLE 9 test results series I to VI.

| Container# | Shape stability | Drop test | Seal strength test | Pressure infusion test | Peel sealability 120° C. 125° C. 130° C. | Stopper-tube connection |
|---|---|---|---|---|---|---|
| Series I | P | P | P | P | | P |
| Series II | P | P | P | P | | |
| Series III | P | P | P | P | | P |
| Series IV | P | P | P | P | | |
| Series V | P | | | | P P P | |
| Series VI | P | | | | P P P | |

From the tables 8 and 9 it can be seen that compositions according to the present invention as described in table 7 are usefull to produce different packaging concepts, that all have the required properties such as retortability, impact strength, seal strength and peelsealability over a broad temperature range.

The invention claimed is:

1. A medical, pharmaceutical, or nutritional container comprising a sealable and retortable composition, said composition comprising a mixture of two components, wherein
   (a) the first component comprises propylene/ethylene copolymer (A) with an ethylene content of 2 to 20 percent by weight, and
   (b) the second component comprises at least one propylene/[alpha]-olefin copolymer (B) and/or at least one propylene homopolymer (C),
wherein
   (i) the propylene/ethylene copolymer (A) has at least one DSC melting area between 30 and 110° C. having a heat of fusion of more than 1 J/g but of less than 65 J/g,
   (ii) the propylene/[alpha]-olefin copolymer (B) has at least one DSC melting point of 130-170° C., and
   (iii) the propylene homopolymer (C) has at least one DSC melting point of 130-170° C.,
wherein
   (A) the total amount of polymers (A), (B), and (C) is at least 80 percent by weight of the composition, and
   (B) the amount of polymer (A) is between 15 and 85 percent by weight of the total amount of polymers (A), (B), and (C).

2. A container according to claim 1, wherein the composition consists essentially of polyolefins.

3. A container according to claim 1, wherein the composition has a MFR (ASTM D 1238 230° C., 2,16 kg) of less than 10 g/10 min.

4. A container according to claim 1, wherein the composition is a sealant material.

5. A container according to claim 1, wherein the container is flexible, transparent, and retortable and comprises at least one weldable surface layer comprising the polymer composition.

6. A container according to claim 5 comprising at least one barrier layer bonded to a surface layer through a tie layer.

7. A container according to claim 6 comprising at least one layer with a nanocomposite.

8. A container according to claim 6 comprising at least one layer with a nanoclay.

9. A container according to claim 1 comprising a sealing or welding material made out of the composition.

10. A container according to claim 1 comprising a nano-coating on at least a part of its outer surface.

11. A container according to claim 1 comprising at least one welded port member comprising the composition.

12. A container according to claim 6 comprising at least two compartments separated by a peelable seal.

13. A container according to claim 1 wherein the total amount of polymers (A), (B), and (C) is at least 90 percent by weight of the composition.

14. A container according to claim 1 wherein the amount of polymer (A) is between 25 and 75 percent by weight of the total amount of polymers (A), (B), and (C).

* * * * *